United States Patent
Rao

(10) Patent No.: US 11,164,032 B2
(45) Date of Patent: Nov. 2, 2021

(54) METHOD OF PERFORMING DATA PROCESSING OPERATION

(71) Applicant: Arm Limited, Cambridge (GB)

(72) Inventor: Jayavarapu Srinivasa Rao, Cambridge (GB)

(73) Assignee: Arm Limited, Cambridge (GB)

( * ) Notice: Subject to any disclaimer, the term of this patent is extended or adjusted under 35 U.S.C. 154(b) by 145 days.

(21) Appl. No.: 16/508,521

(22) Filed: Jul. 11, 2019

(65) Prior Publication Data

US 2021/0012141 A1    Jan. 14, 2021

(51) Int. Cl.
| | | |
|---|---|---|
| *G06K 9/46* | (2006.01) | |
| *G06F 17/15* | (2006.01) | |
| *G06K 9/62* | (2006.01) | |
| *G06T 1/60* | (2006.01) | |
| *G06K 9/00* | (2006.01) | |

(52) U.S. Cl.
CPC ......... *G06K 9/4609* (2013.01); *G06F 17/153* (2013.01); *G06K 9/00973* (2013.01); *G06K 9/6232* (2013.01); *G06K 9/6261* (2013.01); *G06T 1/60* (2013.01)

(58) Field of Classification Search
None
See application file for complete search history.

(56) References Cited

U.S. PATENT DOCUMENTS

| | | | | |
|---|---|---|---|---|
| 2016/0358070 A1* | 12/2016 | Brothers | .............. | G06N 3/0454 |
| 2018/0181858 A1* | 6/2018 | Son | ........................ | G06N 3/0454 |
| 2019/0065896 A1* | 2/2019 | Lee | ........................ | G06N 3/0454 |
| 2019/0340498 A1* | 11/2019 | Mills | ........................ | G06N 3/063 |

* cited by examiner

*Primary Examiner* — Leon Viet Q Nguyen
(74) *Attorney, Agent, or Firm* — EIP US LLP

(57) ABSTRACT

A computer-implemented method of performing a convolution between an input data array and a kernel to generate an output data array includes decomposing the kernel into a plurality of sub-kernels each having a respective position relative to the kernel and respective in-plane dimensions less than or equal to a target kernel dimension, and for each of the plurality sub-kernels: determining a respective portion of the input data array on the basis of the respective in-plane dimensions of the sub-kernel and the respective position of the sub-kernel relative to the kernel; retrieving the respective portion of the input data array; and performing a convolution between the retrieved respective portion of the input data array and the sub-kernel to generate a respective intermediate data array. The method further includes summing the generated intermediate data arrays to generate at least a portion of the output data array.

18 Claims, 8 Drawing Sheets

METHOD OF PERFORMING DATA PROCESSING OPERATION

BACKGROUND OF THE INVENTION

Field of the Invention

The present disclosure relates to methods and apparatus for performing a data processing operation. The disclosure has particular, but not exclusive, relevance to the performance of a convolution operation between an input data array and a kernel.

Description of the Related Technology

Convolutional neural networks (CNNs) have emerged as powerful tools in image processing, machine learning, and related fields. CNN architectures typically include one or more convolutional layers, in which convolution operations are performed between an input data array and one or more kernels. Larger kernels are capable of capturing more expressive features within the input data array, but at the expense of a higher computational cost in implementing the CNN layer.

Neural processing units (NPUs), also referred to as neural network accelerators or artificial intelligence accelerators, are specialized electronic circuits designed to process input data in accordance with specified neural network architectures, for example CNN architectures. NPUs are typically arranged to exploit the structure of neural networks by processing input data across multiple processing nodes in parallel. Each processing node includes local memory and an array of multiply-accumulate (MAC) units for implementing a convolution operation. Although it is desirable for NPUs to have flexibility to deal with a broad range of neural network architectures in an efficient manner, most NPUs are optimized and/or configured for specific kernel sizes, for example 3×3 and smaller kernels.

SUMMARY

According to a first aspect, there is provided a computer-implemented method of performing a convolution between an input data array and a kernel to generate an output data array. The method includes decomposing the kernel into a plurality of sub-kernels each having a respective position relative to the kernel and respective in-plane dimensions less than or equal to a target kernel dimension, and for each of the plurality sub-kernels: determining a respective portion of the input data array on the basis of the respective in-plane dimensions of the sub-kernel and the respective position of the sub-kernel relative to the kernel; retrieving the respective portion of the input data array; and performing a convolution between the retrieved respective portion of the input data array and the sub-kernel to generate a respective intermediate data array. The method further includes summing the generated intermediate data arrays to generate at least a portion of the output data array.

Further features and advantages will become apparent from the following description of preferred embodiments, given by way of example only, which is made with reference to the accompanying drawings.

DETAILED DESCRIPTION OF CERTAIN INVENTIVE EMBODIMENTS

Details of systems and methods according to examples will become apparent from the following description with reference to the figures. In this description, for the purposes of explanation, numerous specific details of certain examples are set forth. Reference in the specification to 'an example' or similar language means that a feature, structure, or characteristic described in connection with the example is included in at least that one example but not necessarily in other examples. It should be further notes that certain examples are described schematically with certain features omitted and/or necessarily simplified for the ease of explanation and understanding of the concepts underlying the examples.

Figure 1:
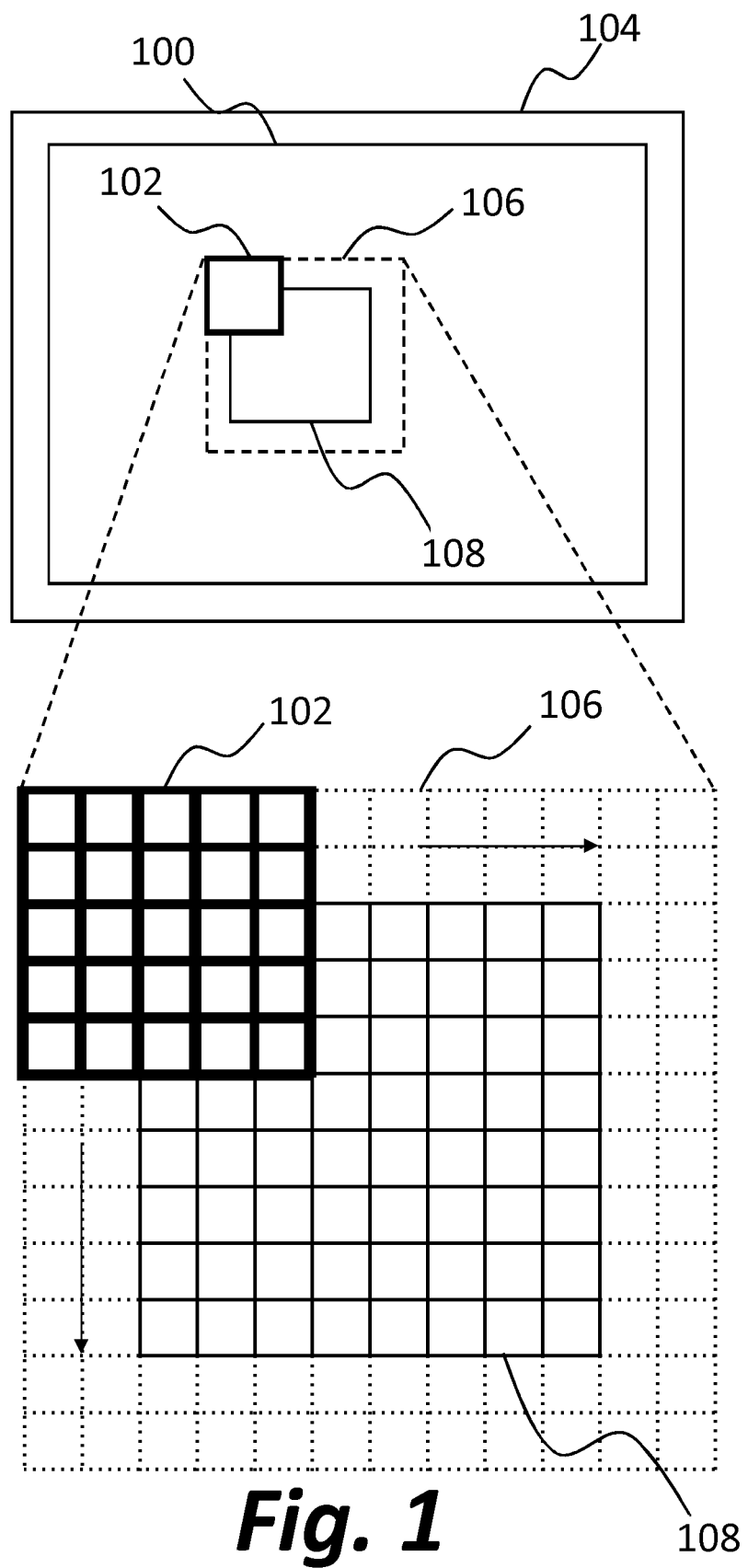
FIG. 1 shows schematically a convolution between an input data array and a kernel.

FIG. 1 shows an example of a convolution between an input data array 100 and a kernel 102, which may also be referred to as a filter 102. In the present example, the input data array 100 in a two-dimensional array representing an image with one color channel. The input data array 100 is formed of a plurality of numerical data elements, which in the present example are pixel values corresponding to color intensities of pixels within the image. In other examples, input data arrays may have other numbers of dimensions, for example one dimension or three dimensions. A three-dimensional data array may be formed of multiple planar slices, where the number of slices is referred to as the depth of the array. For example, a color image may be represented by a three-dimensional array with three or more planar slices, with the different planar slices representing different color channels. For a convolution of the type discussed herein, the kernel has an equal depth to the input data array.

In the example of FIG. 1, the kernel 102 is a planar kernel formed of a 5×5 array of numerical data elements representing kernel weights. The convolution is defined such that for a given position of the kernel 102 relative to the input data array 100, a multiply-accumulate (MAC) operation is performed in which each element of the kernel 102 is multiplied by a coinciding element of the input data array 100, and the resulting products are summed to generate an element of an output data array. To generate the output data array, this MAC operation is performed for each of a predetermined set of positions of the kernel 102 relative to the input data array 100, where the predetermined positions are separated by a fixed number of elements, referred to as a stride, in each in-plane direction of the array. In the present example, the stride is one in each direction, so that neighboring positions of the kernel 102 relative to the input data array 100 are separated by a single element. In this example, zero padding is employed such that the input data array 100 is surrounded by a border 104 with a width/height of two elements, in which all of the elements are set to zero. This zero padding ensures that the output data array has equal dimensions to the input data array 100. In other examples, zero padding may be omitted and/or a stride of greater than one may be used, in which case the output data array would have fewer elements than the input data array 100.

In the example of FIG. 1, a convolution is performed between a 12×12 portion 106 of the input data array 100 and the kernel 102, to generate an 8×8 block 108 of the output data array. In FIG. 1, the block 108 (shown as a solid grid) is shown superimposed on the portion 106 (shown as a dotted grid) to emphasize the position of the block 108 in the output data array relative to the position of the portion 106 of the input data array. Elements of the block 108 may be generated in a serial or parallel manner, depending on the hardware implementation, as will be described in more detail hereafter. Further blocks are generated in the same way, and concatenated to generate the entire output data array.

The portion 106 of the input data array 100 necessary for generating the block 108 can be determined automatically on the basis of co-ordinates associated with the block 108 and the dimensions of the kernel 102. The co-ordinates associated with the block 108 may be, for example, co-ordinates of the top-left element of the block 108, or any other predetermined element of the block 108, within the target output data array. The determined portion 106 includes an 8×8 block of the input data array 100 with co-ordinates corresponding to those of the block 108 of the OFM, and perimeter data consisting of surrounding elements of the input data array 100. For a kernel with an odd number n of elements in one of the in-plane directions, the number of elements of perimeter data in that direction is automatically determined to be (n−1)/2 on both sides of the block. In the example of FIG. 1, the perimeter data therefore consists of two elements on each of the four sides of the 8×8 block, resulting in the 12×12 portion 106 of the input data array 100.

Convolution operations such as that described above are commonly used to generate feature maps within a convolutional layer of a convolutional neural network (CNN). In a given convolutional layer, a feature map is generated by performing convolutions between a single input data array and one or more respective kernels. Each feature map may be indicative of a respective set of features that are pertinent for a given task such as regression or classification of the input data array. Different kernels lead to different sets of features, and a skilled person will appreciate that the weights of a given kernel may be predetermined or may be learned along with other parameters of the CNN during a training phase. Moreover, different sizes of kernel allow for different types of features to be captured. Larger kernels may be capable of capturing more expressive features than smaller kernels, though for many applications, features of interest are highly localized, and therefore able to be captured using small kernels such as 3×3 kernels. Furthermore, the computational complexity convolution operations rapidly increase with kernel size. As a result of these consideration, a large proportion of CNN architectures exclusively use 3×3 kernels. Accordingly, hardware designed for efficient implementation of CNNs is often manufactured and/or configured under the assumption that 3×3 kernels will be implemented.

Each convolution between an input data array and a given kernel generates a planar slice of an output feature map (OFM), such that the depth of the OFM corresponds to the number of kernels applied within the convolutional layer. The OFM will typically undergo further processing operations, for example application of an activation function and optionally pooling, before being passed to a subsequent layer of the CNN. The processed OFM becomes an input feature map (IFM) for the subsequent layer of the CNN. The subsequent layer may be, for example, another convolutional layer or a fully connected layer.

As mentioned above, hardware designed for implementing CNNs is often optimized for specific kernel dimensions, such as 3×3 and smaller kernels, for example due to specific arrangements of MAC arrays for performing the MAC operations, or a specific data format or data pipeline employed within the hardware. In order to perform convolutions with a larger kernel, in accordance with the present invention the larger kernel is decomposed into multiple sub-kernels each having respective dimensions less than or equal to a target kernel dimension. For a system optimized for 3×3 kernels, the target kernel dimension would be three. In other examples, a target kernel dimension may be any other suitable number greater than one, such as two, four, or five. Each of the sub-kernels has a respective position relative to the kernel and includes a subset of the kernel elements. In union, the sub-kernels contain all of the elements of the kernel. For each sub-kernel, a convolution can be performed with the input data array to generate a respective intermediate data array. The intermediate data arrays can later be summed to generate an output data array. In this way, the convolution between the input data array and the kernel is broken down into multiple convolutions for which the hardware is optimized.

Figure 2:
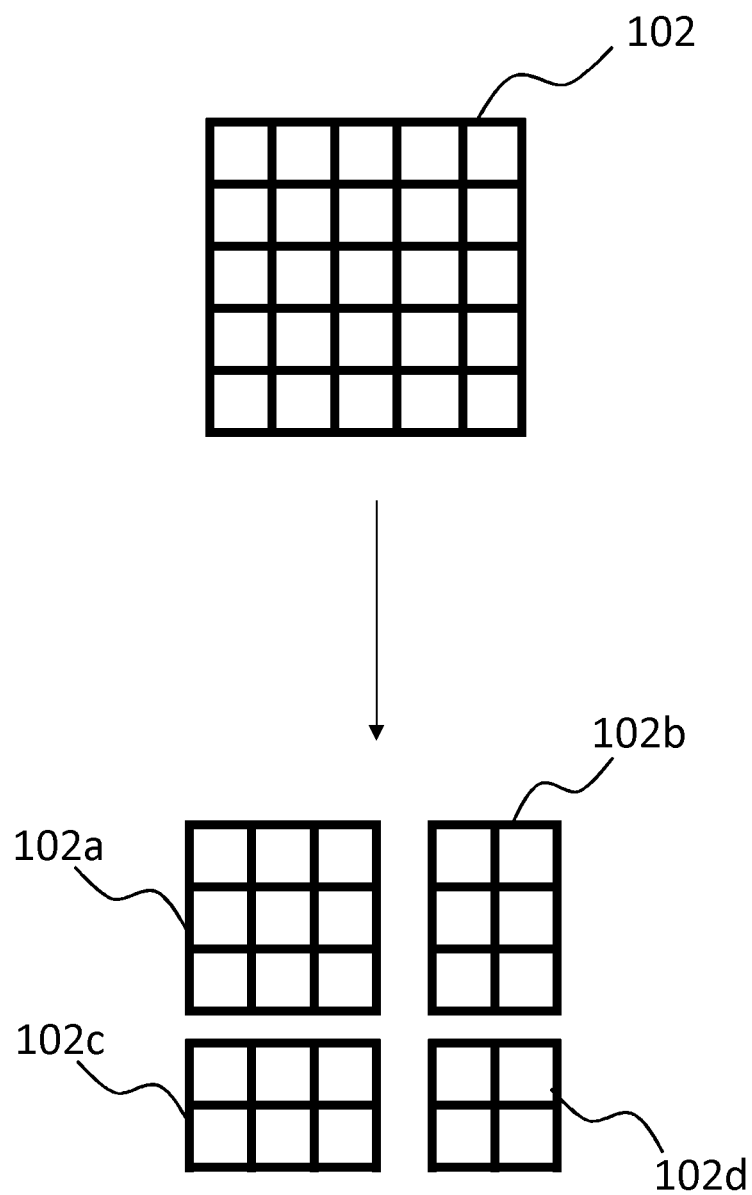
FIG. 2 shows an example of a kernel being decomposed into sub-kernels.

FIG. 2 shows an example in which the 5×5 kernel 102 of FIG. 1 is decomposed into four sub-kernels 102a-d of differing dimensions. It will be appreciated that other decompositions are possible. In the present example, the largest sub-kernel 102a is a 3×3 sub-kernel, and each of the other sub-kernels is smaller. In some cases, a smaller kernel may be implemented as a 3×3 kernel in which some of the elements are set to zero. In this example, it is noted that the in-plane dimensions of the kernel 102 are greater than and indivisible by the target kernel dimension of three. As a result, at least one of the in-plane dimensions of at least one of the sub-kernels is less than the target kernel dimension.

In order to generate the block 108 of the OFM, in accordance with the present invention each of the sub-kernels 102a-d is convolved with a respective portion of the input data array 100, to generate a respective intermediate data array. FIGS. 3a-d show using dotted grids the respective portions 110a-d of the input data array 100 to generate corresponding intermediate data arrays 112a-d (shown as solid grids). In accordance with the present invention, control parameters used to identify portions of input data within memory are modified in such a way that the portions 112a-d are retrieved automatically.

Figure 4:
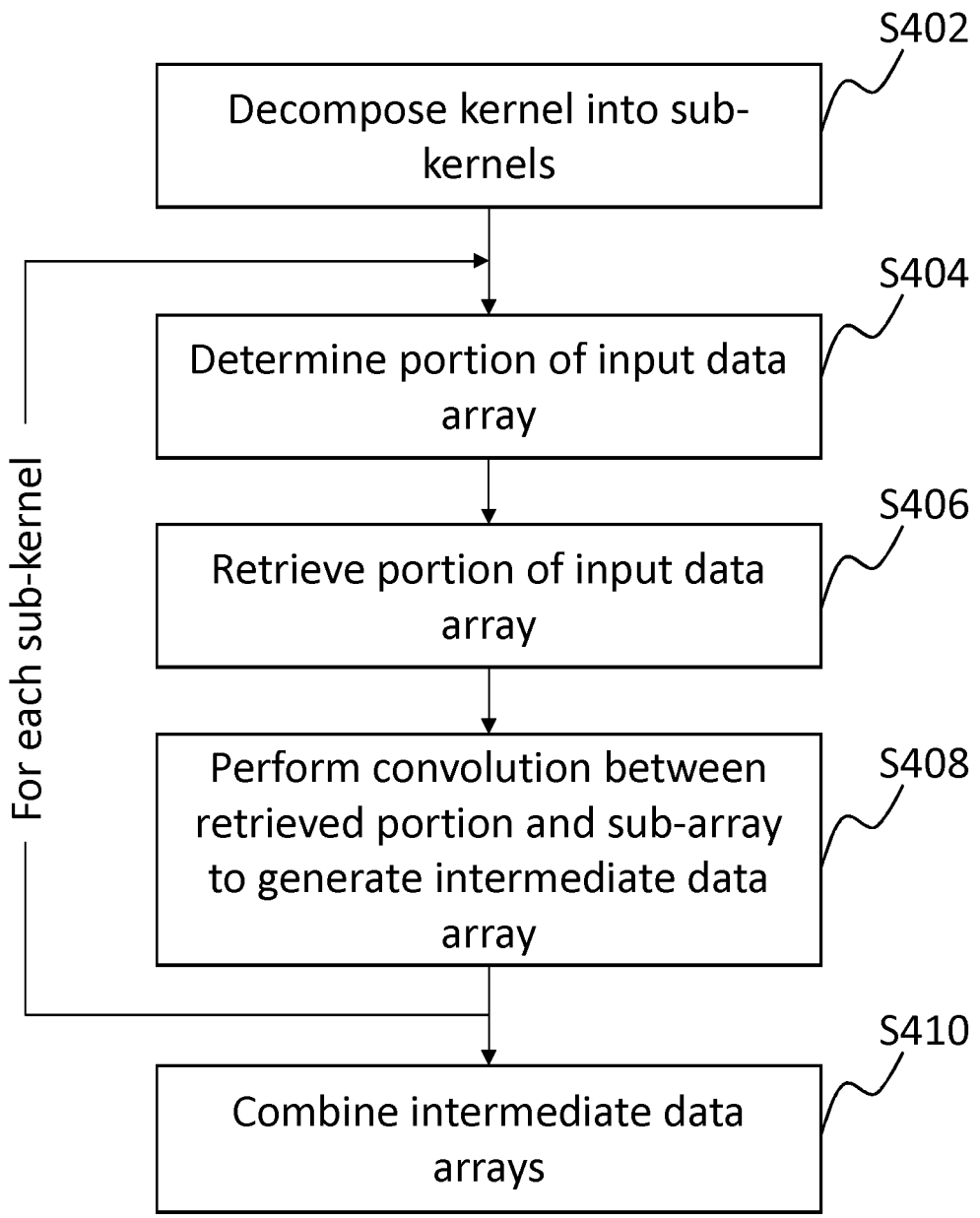
FIG. 4 is a flow diagram representing a method of performing a convolution in accordance with embodiments of the present invention.

FIG. 4 shows an example of a method for a data processing system to perform a convolution between an input data array and a kernel to generate an output data array in accordance with the present invention. Prior to the method of FIG. 4 being carried out, an input data array or a portion of an input data array is loaded into memory circuitry (for example, static random-access memory (SRAM)) in a predetermined format. In accordance with the present invention, the data processing system is configured to automatically retrieve appropriate portions of the input data from the memory circuitry for processing.

As shown in FIG. 4, the data processing system decomposes, at S402, the kernel into a set of sub-kernels, each having respective dimensions and a respective position within the kernel. The kernel is decomposed in-plane, such that each sub-kernel has the same depth as the kernel but only comprises a subset of the elements of the kernel. Each sub-kernel has dimensions less than or equal to a predetermined target kernel dimension, where the target kernel dimension corresponds to a size of kernel for which the hardware of the data processing system is optimized and/or configured. As mentioned above, convolutions are often performed using 3×3 kernels, in which case the target kernel dimension would be three. In some examples, the respective in-plane dimensions of at least one of the sub-kernels are different from the respective in-plane dimensions of at least one other of the sub-kernels.

In some examples, the data processing system determines the respective dimensions of each sub-kernel and the respective position of each sub-kernel within the kernel using a set of decomposition rules. For example, a decomposition rule may specify that any 5×5×d kernel (where d is the depth of the kernel) is decomposed into a 3×3×d sub-kernel, a 2×3×d sub-kernel, a 3×2×d sub-kernel, and a 2×2×d sub-kernel, with relative in-plane positions as shown in FIG. 2. More generally, for a target dimension T, a decomposition rule may specify that a kernel of depth d and arbitrary in-plane dimensions is decomposed from the top-left corner into a regular grid of as many T×T×d sub-kernels as possible, leaving a right border of width R and a bottom border of height S, where R and S are both less than T. The right and bottom borders are decomposed into sub-kernels of dimensions R×T×d and T×S×d respectively, leaving a final sub-kernel of dimensions R×S×d in the bottom right corner. The decomposition shown in FIG. 2 would result from this rule with T=3, such that the decomposition rule determines automatically that R=S=2. It will be appreciated that other decomposition rules are possible without departing from the scope of the invention. In other examples, a kernel may be decomposed on the basis of user input. Sub-kernels may be rectangular or square in the plane of the input data array, and may have the same depth as the kernel.

Having decomposed the kernel into sub-kernels, for each sub-kernel the data processing system determines, at S404, a respective portion of the input data array on the basis of the respective in-plane dimensions of the sub-kernel and the respective position of the sub-kernel relative to the kernel. The respective portions will have different respective locations within the input data array, and for sub-kernels with differing in-plane dimensions to one another, the respective portions will also have different in-plane dimensions to one another.

In some examples, a data processing system may determine, for each sub-kernel, a respective target data offset and a respective data padding configuration corresponding to the determined respective portion of the input data array. As explained above, a portion of an input data array to be processed can be specified using co-ordinates associated with a target data array, and a perimeter data configuration. In the example of FIG. 1, the perimeter data configuration is determined automatically on the basis of the dimensions of the kernel 102. In accordance with certain embodiments of the present invention, a target data offset is introduced, resulting in a translation of the co-ordinate associated with the target data array. A perimeter data configuration is specified to ensure that the resulting input data region has the correct dimensions. Specifying a perimeter data configuration allows for input data regions with different dimensions to be retrieved, allowing for sub-kernels of differing dimensions to be used, thereby making the present method applicable for kernels of all dimensions. Using a target data offset and perimeter data configuration to specify a portion of input data allows sub-kernel convolutions to be performed without modification of hardware and with only minimal modification to executable program code.

Figure 3A:
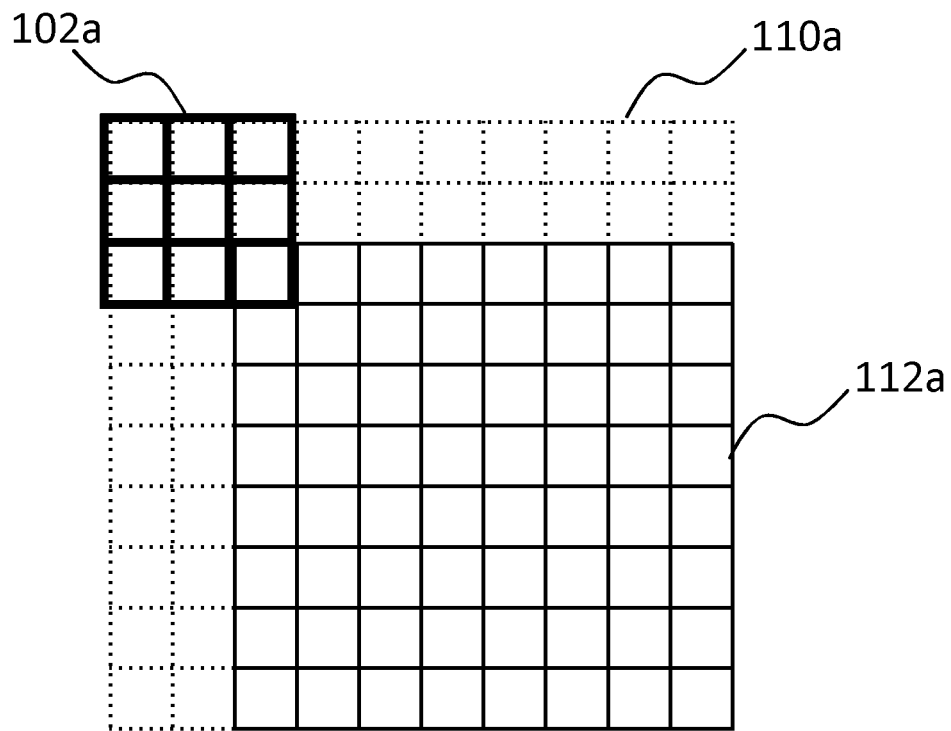
FIGS. 3a-d show schematically convolutions between the sub-kernels of FIG. 2 and respective portions of the input data array of FIG. 1.

In the example of FIG. 3a, a convolution is performed between a portion 110a of the input data array 100 and a 3×3 sub-kernel 102a, to generate an intermediate data array 112a. The sub-kernel 100a is shown in its upper-leftmost position within the portion 110a. In the present example, the portion 110a is specified using a target data offset of zero, and a perimeter data configuration consisting of top perimeter data of two elements and left perimeter data of two elements. It will be appreciated that other target data offsets/perimeter data configurations are possible that would achieve the same result, for example a target data offset of (−1,−1) and perimeter data of one element on each of the four sides.

Figure 3B:
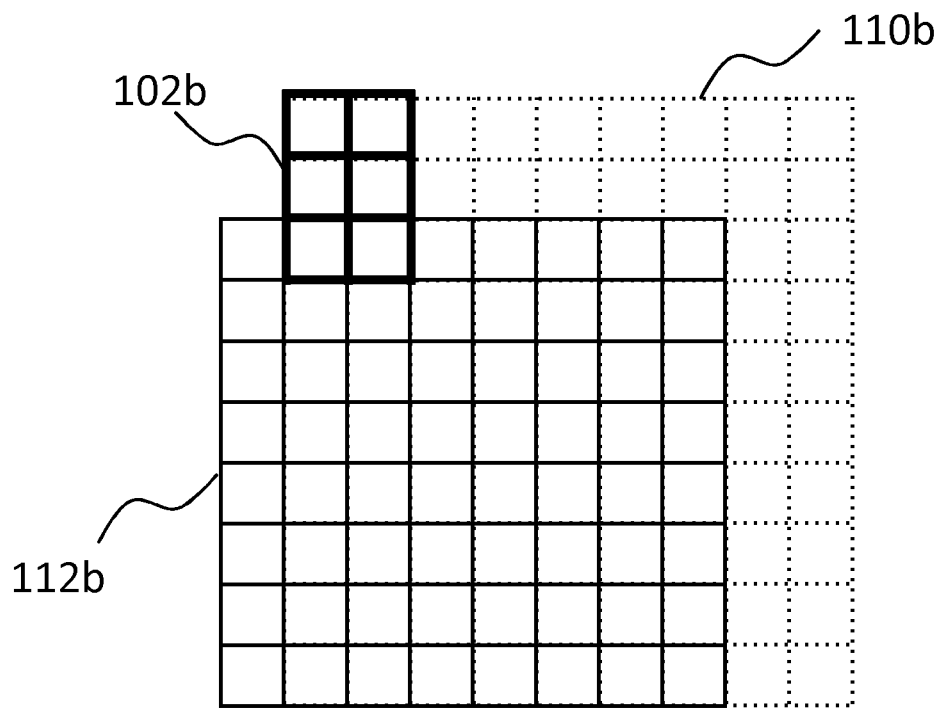

In FIG. 3b, a convolution is performed between a portion 110b of the input data array 100 and a 2×3 sub-kernel 102b, to generate an intermediate data array 112b. The portion 110b is specified using a target data offset of (2,0), top perimeter data of two elements, and left perimeter data of one element.

Figure 3C:
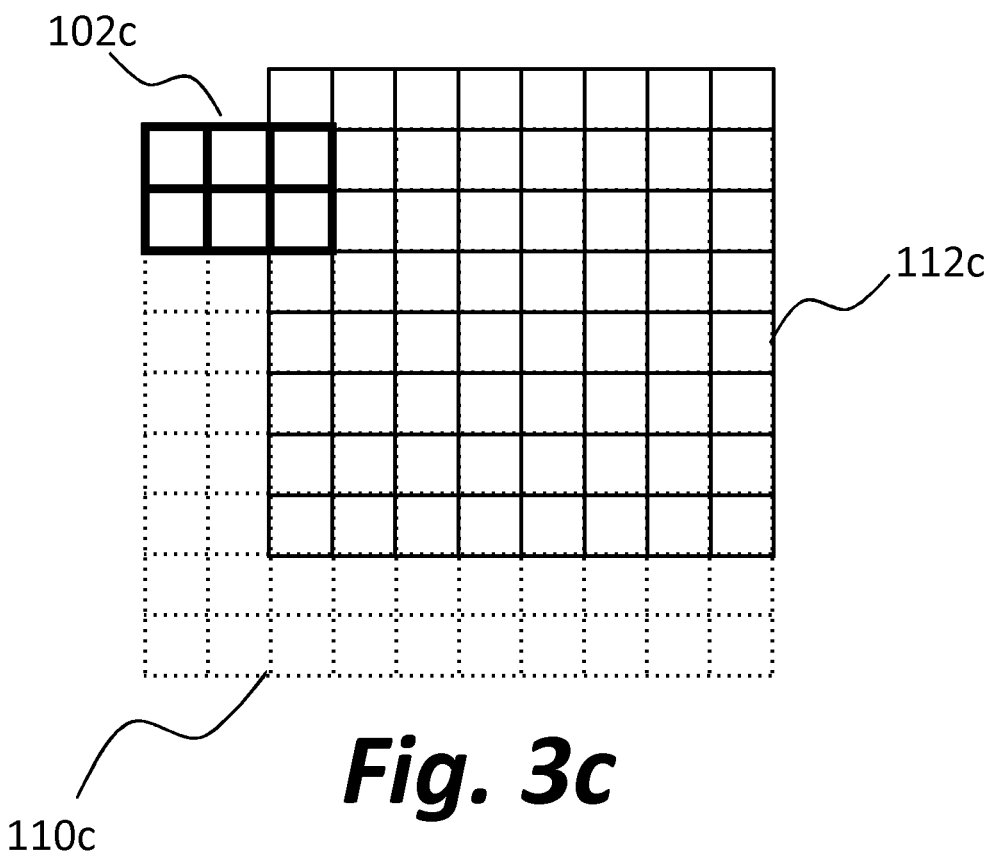

In FIG. 3c, a convolution is performed between a portion 110c of the input data array 100 and a 3×2 sub-kernel 102c, to generate an intermediate data array 112c. The portion 110c is specified using a target data offset of (0,2), top perimeter data of one element, and left perimeter data of two elements.

Figure 3D:
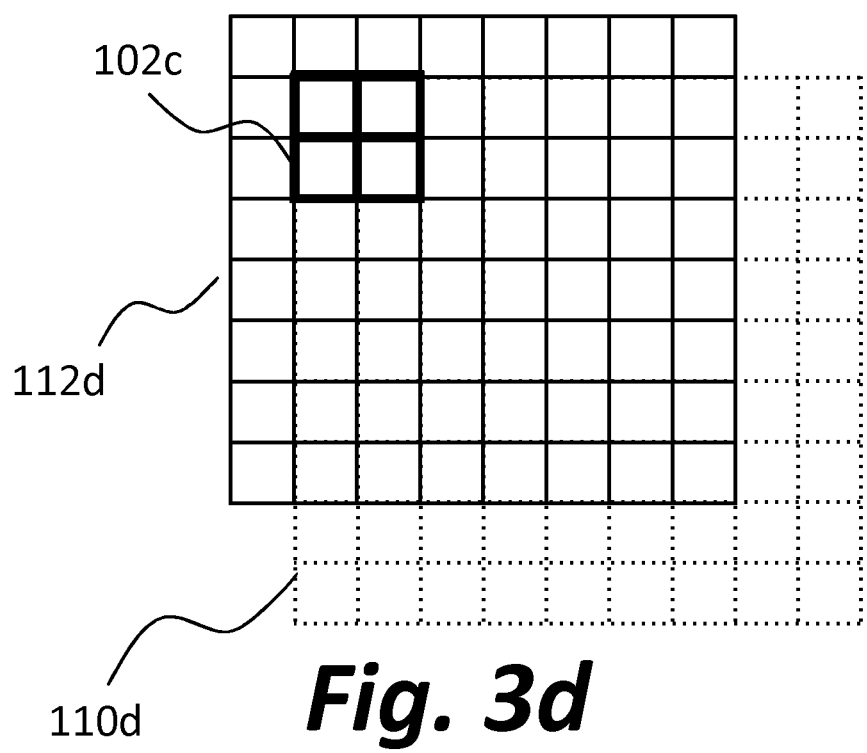

In FIG. 3d, a convolution is performed between a portion 110d of the input data array 100 and a 2×2 sub-kernel 102d, to generate an intermediate data array 112d. The portion 110d is specified using a target data offset of (2,2), top perimeter data of one element, and left perimeter data of one element.

In the example of FIGS. 3a-d, the respective target data offsets and perimeter data configurations are determined according to a set of rules. For each sub-kernel labelled k=1, . . . , K, $\delta w_k$ and $\delta h_k$ are defined respectively as the differences between the target kernel dimension and the width and height of the sub-kernel, and the input data offset $(X_k, Y_k)$ is defined as the co-ordinates of the top-left element of the sub-kernel relative to a predetermined element of the kernel (for example, the central element in a kernel with odd in-plane dimensions). In FIG. 3a, $\delta w_1=0$ and $\delta h_1=0$, because both in-plane dimensions of the sub-kernel 102a (labelled k=1) are equal to the target kernel dimension. The sub-kernel offset $(X_1, Y_1)=(-2, -2)$ because the top-left element of the sub-kernel 102a has co-ordinates of (−2, −2) relative to the central element of the kernel 102 (assuming co-ordinate values increase to the right and downward, as is conventional for images). In FIG. 3b, $\delta w_2=1$ and $\delta h_2=0$ because the sub-kernel 102b (labelled k=2) has height equal to the target kernel dimension but width one less than the target kernel dimension. The sub-kernel offset $(X_2, Y_2)=(1, -2)$ because the top-left element of the sub-kernel 102b has relative co-ordinates of (1, −2) relative to the central element of the kernel 102. In FIG. 3c, $\delta w_1=0$ and $\delta h_1=1$ because the sub-kernel 102c (labelled k=3) has width equal to the target kernel dimension but height one less than the target kernel dimension. The sub-kernel offset $(X_3, Y_3)=(-2,1)$ because the top-left element of the sub-kernel 102c has co-ordinates of (−2,1) relative to the central element of the kernel 102. In FIG. 3d, $\delta w_4=1$ and $\delta h_4=1$ because the sub-kernel 102d (labelled k=4) has width and height one less than the target kernel dimension. The sub-kernel offset $(X_2, Y_2)=(1,1)$ because the top-left element of the sub-kernel 102d has co-ordinates of (1, −2) relative to the top-left element of the kernel 102.

Given the parameters $\{\delta w_k, \delta h_k, X_k, Y_k\}$ for each sub-kernel, in the present example the target data offset $(\hat{X}_k, \hat{Y}_k)$, the left perimeter data width $L_k$, and the top perimeter data height $T_k$, are determined as follows:

If $X_k \leq 0$, then $\hat{X}_k=0$ and $L_k=X_k$;
If $X_k > 0$, then $\hat{X}_k=X_k+\delta w_k$ and $L_k=\delta w_k$;
If $Y_k \leq 0$, then $\hat{Y}_k=0$ and $T_k=Y_k$;
If $Y_k > 0$, then $\hat{Y}_k=Y_k+\delta h_k$ and $T_k=\delta h_k$;

As mentioned previously, other configurations are possible without departing from the scope of the invention, for example specifying bottom perimeter data and right perimeter data instead of using top perimeter data and left perimeter data. In some examples, perimeter data may be specified as equal on opposite sides of the target data array.

In the example described above, the respective target data offsets and perimeter data configurations are determined from the respective dimensions and positions of the sub-kernels. However, this is not necessarily the case, and in some cases is advantageous to include additional flexibility for the target data offset and perimeter data configuration. This additional flexibility may be useful if input data is moved within memory, or if pointer configurations are changed, as will be described in more detail hereafter. In some examples, a flexible target data offset may be used to ensure that the co-ordinate associated with a first element of a target data array is aligned with the start of an SRAM word.

Returning to FIG. 4, for each of the sub-kernels, the data processing system retrieves, at S406, the respective portion of the input data array determined at S404. In an example where the input data portion is specified using a target data offset and perimeter data configuration, the different portions of input data required for the sub-kernel convolutions can be retrieved without moving the input data around in memory circuitry, resulting in more efficient processing of the input data. In other words, by introducing a target data offset that can be dynamically changed between sub-kernels, the input data can remain at fixed memory addresses prior to being retrieved, as opposed to being shifted each time a different sub-kernel is used such that a different portion of the input data array is required.

For each of the sub-kernels, the data processing system performs, at S408, a convolution between the retrieved respective portion of the input data array and the sub-kernel, to generate a respective intermediate data array. For each position of the sub-kernel relative to the retrieved input data array portion, a MAC operation is performed is which the respective products of each element of the sub-kernel and the coinciding element of the input data array portion are summed to generate an element of the intermediate data array. In some implementations, the MAC operations are performed in parallel such that elements of the intermediate data array are generated simultaneously.

Having generated a respective intermediate data array for each of the sub-kernels, the data processing system sums the intermediate data arrays to generate at least a portion of the output data array. The intermediate data arrays are summed elementwise, where the individual elements may be summed in series or in parallel. In the example of FIGS. 3a-d, the 8×8 intermediate data arrays 112a-d generated from convolutions of sub-kernels and respective input data array portions are summed to generate an 8×8 block of an output data array. The generated 8×8 block is identical to the block described with reference to FIG. 1 in which a single convolution was performed between the portion 106 of the input data array 100 and the 5×5 kernel 102. However, in accordance with the present invention, the convolution is performed using kernels with in-plane dimensions less than or equal to the target kernel dimension of three.

Figure 5:
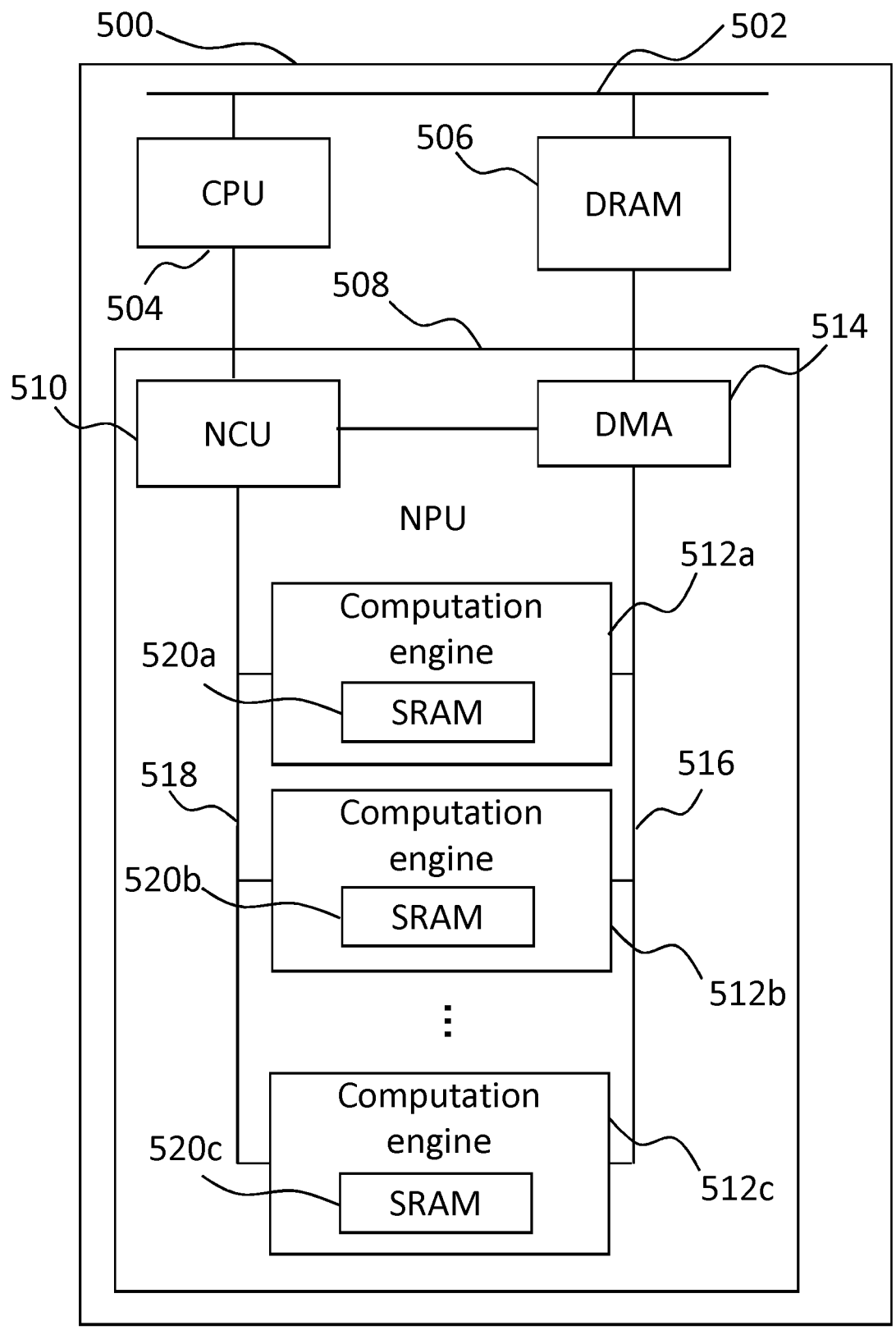
FIG. 5 is schematic block diagram showing an example of a data processing system arranged in accordance with an embodiment of the present invention.

FIG. 5 shows an example of a data processing system 500 arranged in accordance with an embodiment of the present invention. The data processing system 500 includes a system bus 502 connected to a central processing unit (CPU) 504 and dynamic random-access memory (DRAM) 506. The system bus 502 may also be connected to other components not shown in FIG. 5, for example non-volatile storage, input/output devices, a graphics processing unit (GPU), and one or more network interfaces. The data processing system 500 also includes a neural processing unit (NPU) 508, which is a specialized circuit for processing data in accordance with a range of neural network architectures, for example convolutional neural network (CNN) architectures.

The NPU 508 includes a neural control unit (NCU) 510, which includes processing circuitry arranged to generate control data for multiple computation engines, referred to collectively as computation engines 512. In accordance with the present invention, the NCU 510 is arranged to determine how a kernel is decomposed into sub-kernels, for example using decomposition rules stored by memory circuitry within the NCU 510, or in accordance with user input received via the CPU 504. The NCU 510 is also arranged to determine respective portions of input data to be processed on the basis of the determined sub-kernels. In this example, the NCU 510 is arranged to specify the respective portions of input data using a respective target data offset and perimeter data configuration, as described above with reference to FIG. 4. In other examples, dedicated hardware may be provided to determine how to decompose a kernel into sub-kernels, and/or to determine respective portions of input data using the determined sub-kernels.

Three of the computation engines, 512a-c, are shown in FIG. 5. In the present example, the NPU 508 includes sixteen computation engines 512, though it will be appreciated that different numbers of computation engines could be employed without departing from the scope of the invention. The computation engines 512 are arranged to receive input data from the DRAM 506 via a direct memory access (DMA) 514 and a main data channel 516. The input data received from the DRAM 506 can include, for example, image data or IFM data, along with weight data associated with sub-kernels to be applied within a given CNN layer. The computation engines 512 are arranged to process the received input data in accordance with control data received from the NCU 510 via a control data channel 518.

Each of the computation engines 512 includes SRAM 520. The computation engines 126 include processing circuitry configured to retrieve input data stored by the SRAM 520 for processing in accordance with present invention, for example as described above with reference to FIG. 4.

Figure 6:
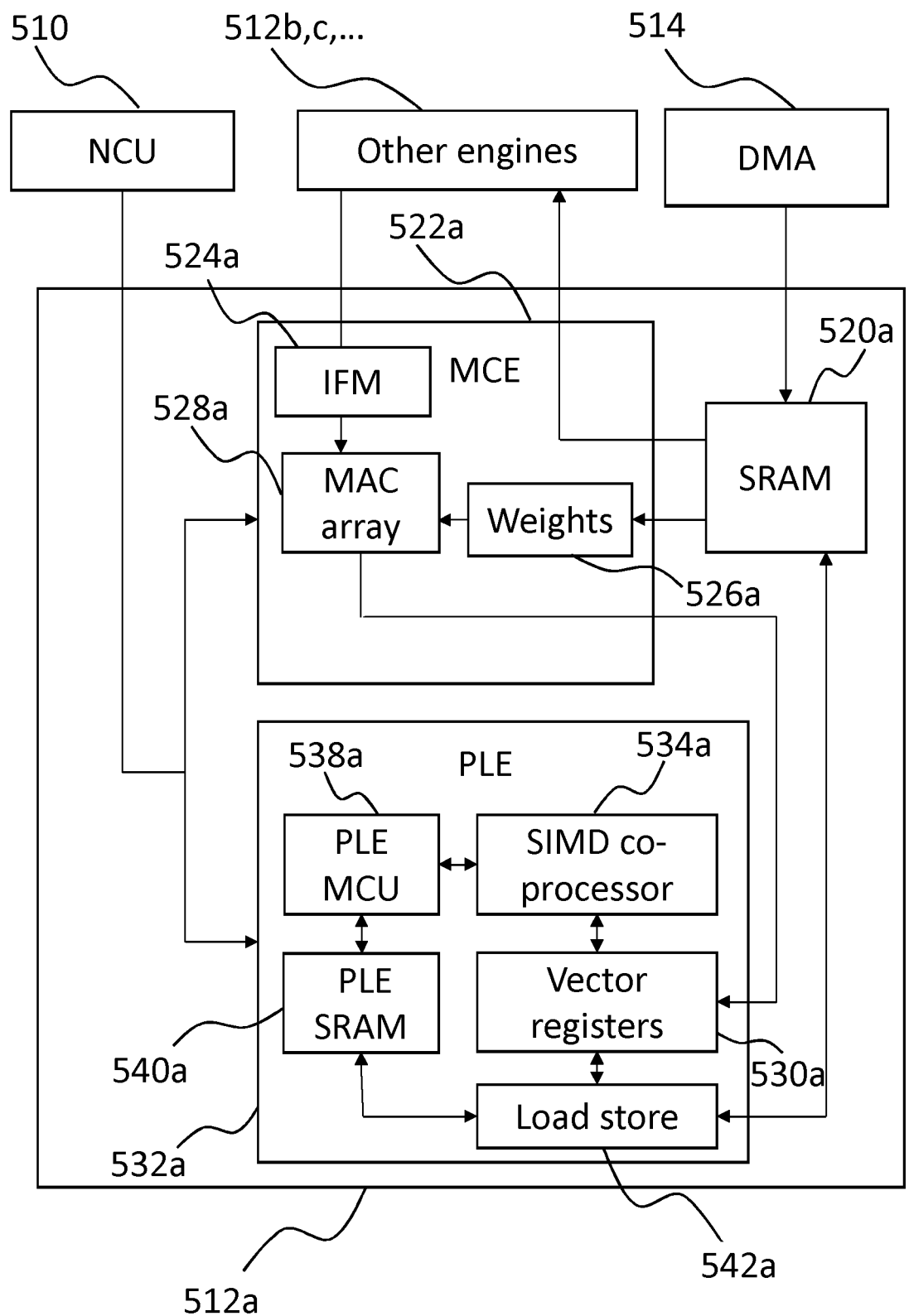
FIG. 6 is a schematic block diagram showing a computation engine of the data processing system of FIG. 5.

FIG. 6 shows the computation engine 512a in more detail. In the present example, the other computation engines 512b, c, . . . include substantially the same components as the computation engine 512a. In addition to the SRAM 520a mentioned above, the computation engine 512a includes a MAC computation engine (MCE) 522a, which is arranged to process data retrieved from the SRAM 520 of the computation engines 520 in accordance with control data received from the NCU 510. The MCE 522a includes an input feature map (IFM) buffer 524a and a weights buffer 526a for passing IFM data (or image data) and weights data respectively to a MAC array 528a. The MAC array 528a includes multiple MAC units and accumulators for performing MAC operations in parallel. In accordance with the present invention, the MAC array 528a is configured to perform a convolution between a portion of an input data array and a sub-kernel to generate a planar slice of an intermediate data array. In the present example, the MAC array 528a includes a 16×16 array of accumulators (with additional accumulators to deal with overflow), and is accordingly able to generate a 16×16 planar slice of an intermediate data array by generating the elements of the slice in parallel. Furthermore, in certain configurations, the MAC array 528a may be arranged to sum corresponding elements of multiple generated intermediate data array slices to generate a slice of an OFM block. In other configurations, the MAC array 528a may be arranged to transmit the intermediate data array slices to a vector register array 530a of a programmable layer engine (PLE) 532a. The PLE 532a includes a single-instruction multiple data (SIMD) co-processor 534a arranged to perform vector operations on data stored in the vector register array 530a. In a configuration where the MAC array 528a passes intermediate data arrays to the vector register array 530a, the SIMD co-processor 536a is arranged to sum the intermediate data array slices using vector operations to generate a slice of an OFM block.

The PLE 532a is arranged to perform additional processing operations on slices of OFM data, including, for example, pooling operations and applying activation functions. The PLE 532a can be programmed to perform different operations for different layers within a given CNN, allowing for a broad range of CNN architectures to be implemented. Accordingly, the PLE 532a includes a PLE microcontroller unit (MCU) 538a, which is arranged to execute program data stored by PLE SRAM 540a. The PLE 532a further includes a load store 542a, which is arranged to transfer data in an efficient manner between the SRAM 130a, the vector registers 150a, and the PLE SRAM 148a.

The PLE 532a is arranged to output the processed OFM data, via the load sore 542a, to the SRAM 512a of the computation engine 512a. In the context of a CNN, the processed OFM data becomes IFM data for the next layer in the CNN, which may be, for example, a further convolutional layer or a fully connected layer. The processed data may be broadcast to the other computation engines 512 for further processing, or may be output to the DRAM 506 of the data processing system 500.

Figure 7:
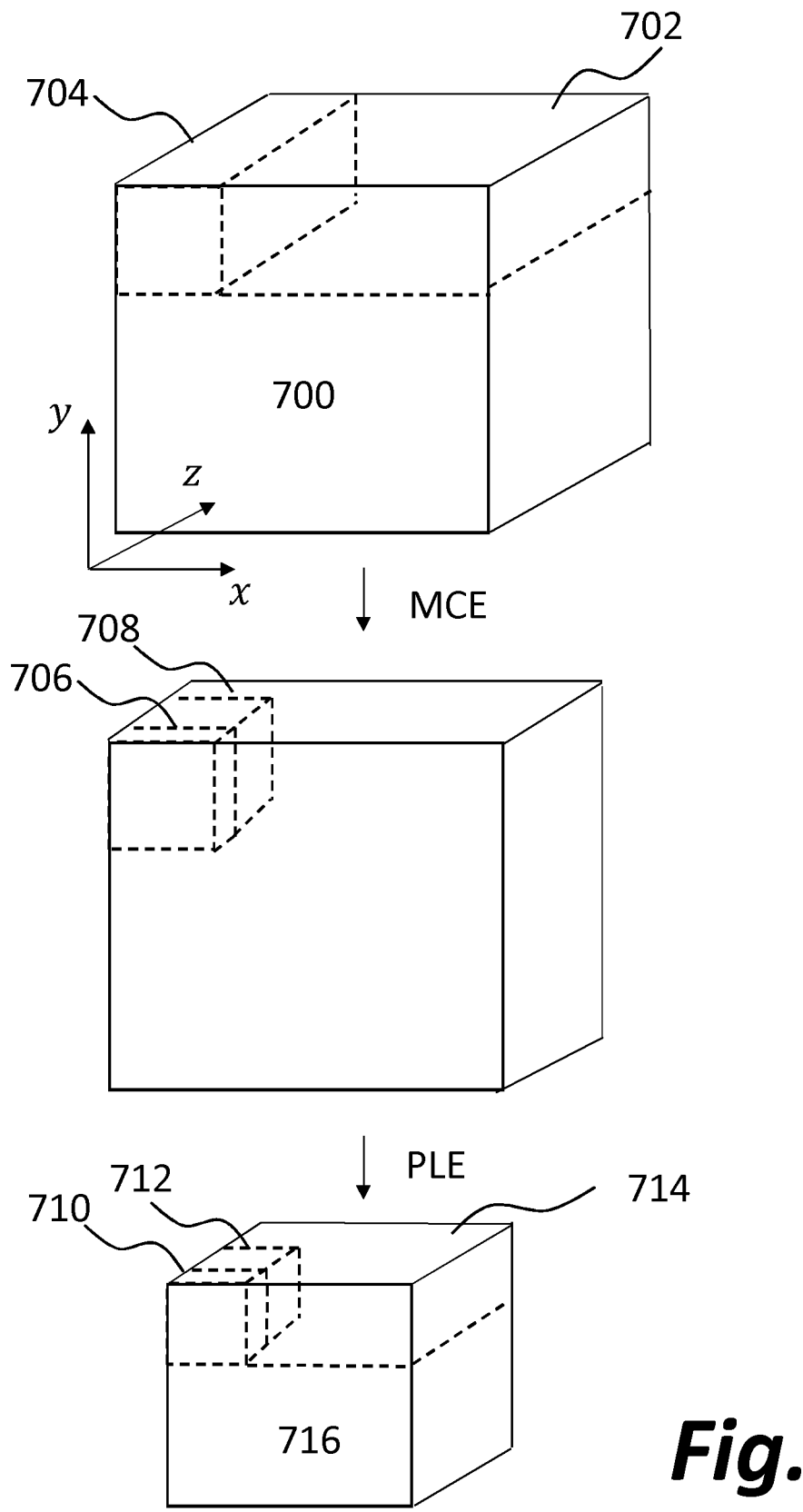
FIG. 7 shows schematically an input feature map being processed by the data processing system of FIG. 5.

FIG. 7 shows an illustrative example of an IFM 700 being processed by the NPU 508 within a layer of a CNN, in accordance with an embodiment of the present invention. In this example, the IFM 700 has in-plane dimensions in the xy plane and a depth dimension in the z direction. For processing by the NPU 508, the IFM 700 is divided into subregions referred to as stripes, which in the present example each span the full width of the IFM 700 in the x direction, the full depth of the IFM 700 in the z direction, and part of the height of the IFM 700 in the y direction. It should be appreciated that this definition of a stripe is illustrative only, and other arrangements are possible. For example, a stripe may include only a part of the width of an IFM. In FIG. 7, the stripe 702 corresponds to the portion of the IFM 700 above the dashed horizontal line. Prior to processing of the stripe 702, the stripe 702 is stored across the SRAM 520 of all of the computation engines 512. The SRAM 520 of each of the computation engines 512, and therefore the SRAM 520 as a whole, is only able to store a limited amount of data, so typically a predetermined number of stripes will be loaded into the SRAM 520 at any one time. Occasionally, input data may be required from a stripe that is not loaded into SRAM 520, in which case data may need to be moved within the memory circuitry of the data processing system 500, for example by transferring a part of an input data array such as a stripe from the DRAM 506 to the SRAM 520. In such cases, respective target data offsets and perimeter data configurations for one or more sub-kernels may be updated to account for the data being moved within memory.

During processing, each of the computation engines 512 requires access to the entire stripe 702, and therefore portions of the stripe 702 are broadcast to the respective MAC arrays 528 of the computation engines 512. The DRAM 506 loads respective weight data to the SRAM 520 of each of the computation engines 512, corresponding to a sub-kernel of a given kernel to be applied by that computation engine. The MCEs 522 simultaneously process portions of the stripe 702, using the respective weight data, to generate slices of intermediate data arrays. In the present configuration, the MCEs 522 sum the generated slices of the intermediate data arrays to generate slices of OFM data. In the example of FIG. 7, the MCE 522a processes the portion 704 as described above with reference to FIG. 4, using multiple sub-kernels, to generate a 16×16×1 slice 706 of OFM data (where the in-plane size of the slice 706 is limited by the number of accumulators in the MAC array 528a).

The computation engines 512 independently generate slices of OFM data from the portion 704 of the stripe 702 and respective different weight data, where the slices correspond to OFM data at different depths. In the present example, the sixteen computation engines 512 together generate a 16×16×16 OFM block 708. In the CNN layer depicted in FIG. 7, more than 16 kernels are applied in total, and the depth of the OFM block 708 is therefore less than the full depth of the OFM data to be computed. In order to compute the full depth of OFM data, at least some of the computation engines 512a compute slices of a further OFM block at the same in-plane position as the OFM block 708.

The slice 706 of OFM data generated by the MCE 136a is output to the vector registers 530a of the PLE 532a, and the PLE 532a performs further processing operations including applying an activation function (for example, a rectified linear unit (ReLU) activation function) and, for the present CNN layer, applying 2×2 max pooling. Passing slices of OFM data directly from the MCEs to the PLEs of the computation engines 512 reduces the number of accesses to SRAM, improving the efficiency and speed of data processing. As mentioned above, the PLE 532a is dynamically programmed such that the PLE 532a can perform different processing operations for different CNN layers. The PLE 532a generates a slice 710 of processed OFM data, which is passed to the SRAM 520a of the computation engine 512a. The sixteen slices of OFM data in the OFM block 708 are processed simultaneously by the PLEs 532, resulting in a block 712 of processed OFM data. The computation engines 512 generate further blocks, traversing in the in-plane and out-of-plane directions as necessary until an entire stripe 714 of processed OFM data has been generated. The stripe 714 becomes a stripe of an IFM 716 to be processed by the next CNN layer. Different portions of the stripe 714 are stored at different computation engines 512, and may either be broadcast between the computation engines as they are processed by the next CNN layer, or may be passed back to the DRAM 506. In some examples, multiple CNN layers may be implemented for a single stripe before progressing to a new stripe, minimizing the number of DRAM accesses required for storage of intermediate stripe data. In other examples, an entire IFM may be processed by a single CNN layer before moving to the next CNN layer, minimizing the number of DRAM accesses required to retrieve weight data.

The above examples are to be understood as illustrative examples of the present disclosure. Further examples are envisaged. For example, an NPU may be arranged differently to that shown in FIGS. 5 and 6, for example including a different arrangement of computation engines and/or components within the computation engines. In some examples, a target kernel dimension may be programmable, as opposed to being predetermined. In some examples, methods described herein may be used to perform other convolution-type operations, for example those employed in a kernel-based finite difference scheme for solving differential equations.

It is to be understood that any feature described in relation to any one example may be used alone, or in combination with other features described, and may also be used in combination with one or more features of any other of the examples, or any combination of any other of the examples. Furthermore, equivalents and modifications not described above may also be employed without departing from the scope of the disclosure, which is defined in the accompanying claims.

What is claimed is:

1. A computer-implemented method of performing a convolution between an input data array and a kernel to generate an output data array, the method comprising:
   decomposing the kernel into a plurality of sub-kernels, wherein each sub-kernel:
   comprises a respective contiguous portion of the kernel;
   has a respective position relative to the kernel; and
   has respective in-plane dimensions less than or equal to a target kernel dimension; and
   for each of the plurality sub-kernels:
   determining a respective target data offset and perimeter data configuration based on the respective in-plane dimensions of the sub-kernel and the respective position of the sub-kernel relative to the kernel;
   retrieving a respective contiguous portion of the input data array having a position and dimensions relative to a target data array as determined by the respective target data offset and perimeter data configuration;
   performing a convolution between the retrieved respective contiguous portion of the input data array and the sub-kernel to generate a respective intermediate data array,
   the method further comprising summing the generated intermediate data arrays to generate at least a portion of the output data array.

2. The method of claim 1, wherein:
   at least one in-plane dimension of the kernel is greater than and indivisible by the target kernel dimension; and
   at least one of the in-plane dimensions of at least one of the sub-kernels is less than the target kernel dimension.

3. The method of claim 1, wherein the respective in-plane dimensions of at least one of the sub-kernels are different from the respective in-plane dimensions of at least one other of the sub-kernels.

4. The method of claim 1, wherein for each sub-kernel, performing the convolution between the respective portion of the input data array and the sub-kernel to generate the respective intermediate data array comprises performing a plurality of multiply-accumulate operations in parallel.

5. The method of claim 1, comprising determining the respective dimensions of each sub-kernel and the respective position of each sub-kernel relative to the kernel using a set of decomposition rules.

6. The method of claim 1, wherein the input data array corresponds to an image or an input feature map and the output data array corresponds to an output feature map.

7. The method of claim 1, wherein the target kernel dimension is programmable.

8. A data processing system comprising:
   memory circuitry arranged to store an input data array and a kernel; and
   processing circuitry configured to:
   decompose the kernel into a plurality of sub-kernels, wherein each sub-kernel:
   comprises a respective contiguous portion of the kernel;
   has a respective position relative to the kernel; and
   has respective in-plane dimensions less than or equal to a target kernel dimension; and
   for each of the plurality of sub-kernels:
   determine a respective target data offset and perimeter data configuration based on the respective in-plane dimensions of the sub-kernel and the respective position of the sub-kernel relative to the kernel;
   retrieve a respective contiguous portion of the input data array from the memory circuitry, the respective contiguous portion having a position and dimensions relative to a target data array as determined by the respective target data offset and perimeter data configuration;
   perform a convolution between the retrieved respective contiguous portion of the input data array and the sub-kernel to generate a respective intermediate data array,
   wherein the processing circuitry is further configured to sum the generated intermediate data arrays to generate at least a portion of the output data array.

9. The system of claim 8, wherein:
   at least one in-plane dimension of the kernel is greater than and indivisible by the target kernel dimension; and
   at least one of the in-plane dimensions of at least one of the sub-kernels is less than the target kernel dimension.

10. The system of claim 8, wherein the respective in-plane dimensions of at least one of the sub-kernels are different from the respective in-plane dimensions of at least one other of the sub-kernels.

11. The system of claim 8, wherein:
    the memory circuitry comprises first memory circuitry and second memory circuitry; and
    the processing circuitry is arranged to:
    transfer at least part of the input data array from the first memory circuitry and the second memory circuitry; and
    update, for each of the plurality of sub-kernels, the respective target data offset and perimeter data configuration.

12. The system of claim 11, wherein the first memory circuitry comprises static random-access memory (SRAM) and the second memory circuitry comprises dynamic random-access memory (DRAM).

13. The system of claim 8, wherein the processing circuitry comprises a multiply-accumulate (MAC) array comprising a plurality of accumulators arranged to generate elements of the intermediate data arrays in parallel.

14. The system of claim 13, wherein the accumulators are configured to sum respective corresponding elements of the intermediate data arrays to generate respective elements of the at least portion of the output data array.

15. The system of claim 8, wherein:
the memory circuitry is arranged to store a set of decomposition rules; and
the processing circuitry is configured to determine the respective in-plane dimensions of each sub-kernel and the respective position of each sub-kernel within the kernel using the set of decomposition rules.

16. The system of claim 8, wherein the target kernel dimension is programmable.

17. A non-transitory computer-readable storage medium storing instructions which, when executed by processing circuitry of a computer, cause the computer to perform a convolution between an input data array and a kernel to generate an output data array by:
determining a plurality of sub-kernels of the kernel, wherein each sub-kernel:
comprises a respective contiguous portion of the kernel;
has a respective position relative to the kernel; and
has respective in-plane dimensions less than or equal to a target kernel dimension; and
for each of the plurality sub-kernels:
determining a respective target data offset and perimeter data configuration based on the respective in-plane dimensions of the sub-kernel and the respective position of the sub-kernel relative to the kernel;
retrieving a respective contiguous portion of the input data array having a position and dimensions relative to a target data array as determined by the respective target data offset and perimeter data configuration;
performing a convolution between the retrieved respective contiguous portion of the input data array and the sub-kernel to generate a respective intermediate data array, and
summing the generated intermediate data arrays to generate at least a portion of the output data array.

18. The non-transitory computer-readable storage medium of claim 17, wherein:
at least one in-plane dimension of the kernel is greater than and indivisible by the target kernel dimension; and
at least one of the in-plane dimensions of at least one of the sub-kernels is less than the target kernel dimension.

\* \* \* \* \*